US007760184B2

(12) United States Patent
Pihlaja

(10) Patent No.: US 7,760,184 B2
(45) Date of Patent: Jul. 20, 2010

(54) DUAL MODE INPUT DEVICE

(75) Inventor: Pekka Pihlaja, Helsinki (FI)

(73) Assignee: Nokia Corporation, Espoo (FI)

( * ) Notice: Subject to any disclaimer, the term of this patent is extended or adjusted under 35 U.S.C. 154(b) by 963 days.

(21) Appl. No.: 11/397,919

(22) Filed: Apr. 3, 2006

(65) Prior Publication Data

US 2007/0229456 A1 Oct. 4, 2007

(51) Int. Cl.
*G06F 3/033* (2006.01)

(52) U.S. Cl. ...................................................... 345/157

(58) Field of Classification Search ......... 345/157–160, 345/164, 167, 184

See application file for complete search history.

(56) References Cited

U.S. PATENT DOCUMENTS

| | | | | |
|---|---|---|---|---|
| 5,808,602 | A * | 9/1998 | Sellers | 345/157 |
| 6,546,231 | B1 * | 4/2003 | Someya et al. | 455/550.1 |
| 6,580,417 | B2 * | 6/2003 | Rosenberg et al. | 345/157 |
| 2005/0052425 | A1 * | 3/2005 | Zadesky et al. | 345/173 |
| 2006/0250357 | A1 * | 11/2006 | Safai | 345/157 |
| 2006/0267934 | A1 * | 11/2006 | Harley et al. | 345/157 |
| 2006/0290671 | A1 * | 12/2006 | Bohn et al. | 345/163 |

* cited by examiner

*Primary Examiner*—Richard Hjerpe
*Assistant Examiner*—Sahlu Okebato

(57) ABSTRACT

When the user depresses a freely rotating input device, it engages a spring-cantering mechanism and enables the user to move the pointer quickly with a velocity control pointing method. The spring-centering provides the user haptic feedback of the pointer speed. When the pointer is near the target, the user can switch rapidly to the more accurate position control pointing method of the freely rotating mode by letting the input device back to the up-position.

16 Claims, 3 Drawing Sheets

DUAL MODE INPUT DEVICE

TECHNICAL FIELD OF THE INVENTION

The invention concerns a pointing device for controlling a pointer on a user interface. Furthermore the invention concerns a system having the pointing device. Yet furthermore the invention concerns use of both.

BACKGROUND ART

Normally input devices are rotating pointing devices or sliding devices for controlling the pointer on the user interface. Examples of rotating pointing devices are a scroll wheel (also know as roller in apparatuses such as mobile phones), a rotator, a rotating knob, a trackball, etc. Basically the rotating or sliding pointing device is provided with one degree of freedom (1-DOF). Thus it can rotate in a plane. The scroll wheel will be presented here as an example because of its clarity. Thus the scroll wheel is basically a pointing device with one degree of freedom (1-DOF).

There are two types of scroll wheel, which may look similar, but function quite differently. The type of scroll wheel used e.g. on the Logitech Mouseman mouse, is an ideal input device for scrolling short lists. The wheel can rotate freely, but preferably a mechanism is incorporated for providing tactile clicks to select the lines or items in the list. The clicks enable accurate and very comfortable scrolling. The pointing method used here is called the position control method. The rotational position of the wheel corresponds one-to-one with the position of the pointer or highlight in the list. Note, that the 'positions' of the wheel can cover more than 360 degrees of rotation.

A problem arises if the movable distance is long, e.g. the list contains tens or hundreds of items, as is typically the case with lists of music in music players (or lines of text in a document etc.). Here, the pointer (or cursor or highlight, depending on application) needs to travel long distances. With position control method the user is forced to turn the wheel even many revolutions, which is slow and fatiguing.

Moving the pointer long lists is easier with the second type of scroll wheel. This type is spring-centered and can be deflected from the center-position maybe only about 45 degrees in either direction. The pointing method used with it is called the velocity control method. The pointer moves with a speed which is relative to the angle the scroll wheel is deflected from its center position. An example of a spring-centered scroll wheel is found on the Wacom mouse used with Wacom Intuos graphics tablets.

The haptic feedback provided by the spring is needed for controlling the pointer speed. Also, simply letting go of the scroll wheel can stop the pointer. Without spring centering it is very difficult to find the center position and stop the pointer.

With a spring-centered scroll wheel, using the velocity control method, you can move the pointer quickly. Unfortunately, the pointing action is not as accurate as with the position control method of a freely rotating scroll wheel. So, the problem with prior art solutions is that you can have either fast pointing or accurate pointing depending on the type of scroll wheel you have on your device.

SUMMARY OF THE INVENTION

It is therefore the object of the invention to provide a pointing device which is capable of accurate as well as fast positioning of the pointer.

In accordance with an aspect of the invention a pointing device is provided for controlling a pointer on a user interface, the pointing device comprising two positions:

a position arranged to control the pointer linearly in accordance with an amount of movement of the pointing device, and another position arranged to control the pointer so that the pointer is arranged to move with a speed, which speed is relative to a movement, which movement the pointing device is deflected from a central position of the pointing device.

In accordance with another aspect of the invention an apparatus and a system are provided having the pointing device. Yet furthermore the invention concerns use of both.

The invention allows the user to move the pointer quickly using the pointing device in the another position, where the movement corresponds to the speed of the pointer. When the pointer is near the target, the user can rapidly switch to the first position in the freely moving mode for accurate pointing. The invention provides appropriate haptic feedback for both the positions.

Various further embodiments can be implemented as a scroll wheel, a roller, rotator, rotating knob, a slider, a joystick, a trackball, etc.

Various further embodiments disclose a pointing device such as a scroll wheel with both a freely rotating and a spring-centered operating mode and fast switching between the two positions. Various further embodiments allow the user to move the pointer quickly using the velocity control method in the spring-centered mode. When the pointer is near the target, the user can switch rapidly to the position control method in the freely rotating mode for accurate pointing.

Yet further embodiments of the invention have been specified in the detailed description below.

BRIEF DESCRIPTION OF THE DRAWINGS

The invention will now be described, by way of examples only, with reference to the accompanying drawings, in which.

DESCRIPTION OF FURTHER EMBODIMENTS

Various further embodiments of the invention can be applied to rotating or sliding pointing devices such as the scroll wheel (also know as roller in mobile phones), rotator, rotating knob, a slider (also known from laptop computers) or a trackball. The scroll wheel will be presented here as one of the preferred implementation because of its simplicity and clarity. The scroll wheel is basically a pointing device with one degree of freedom (1-DOF).

Figure 1:
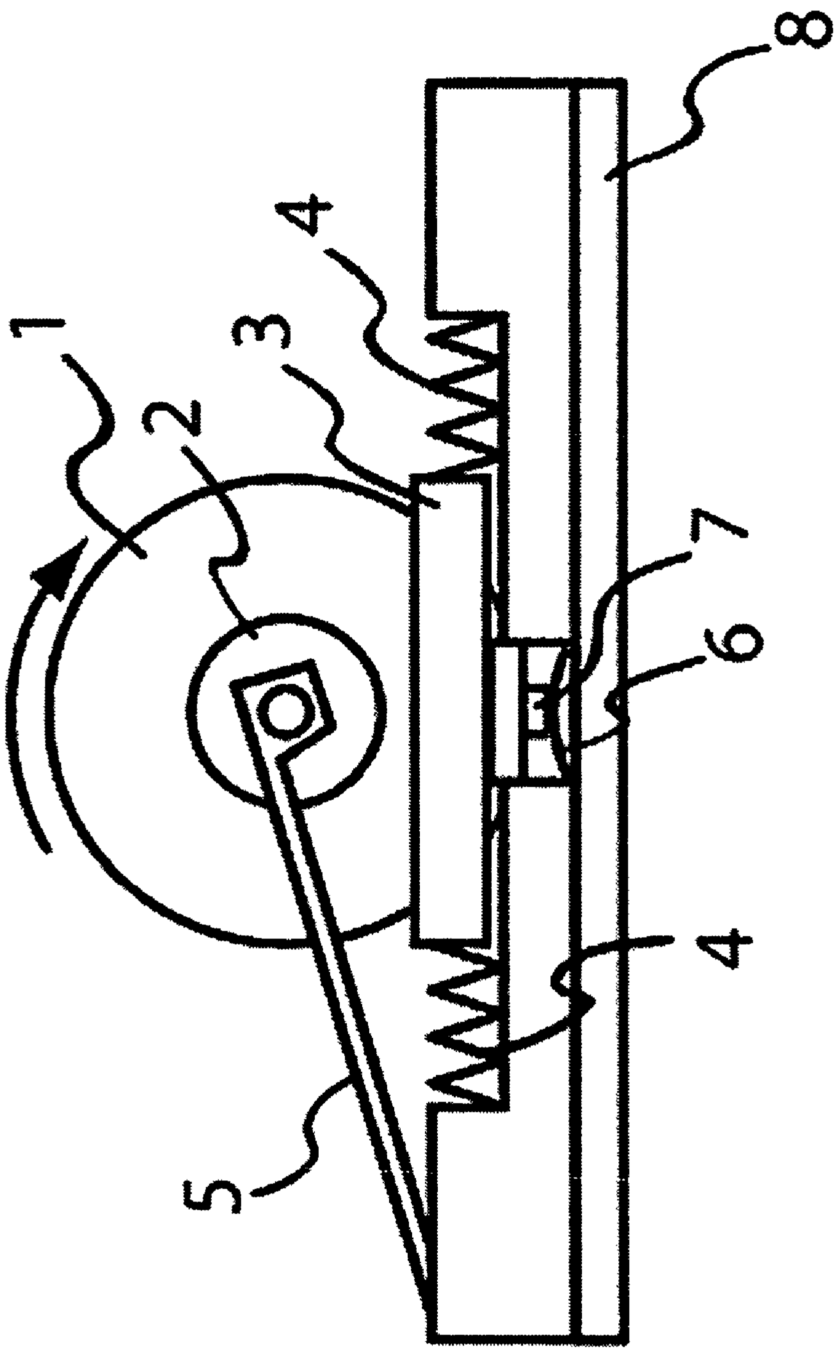
FIG. 1 depicts a schematic representation of an embodiment of the invention, where the pointing device is in the first position.
Figure 2:
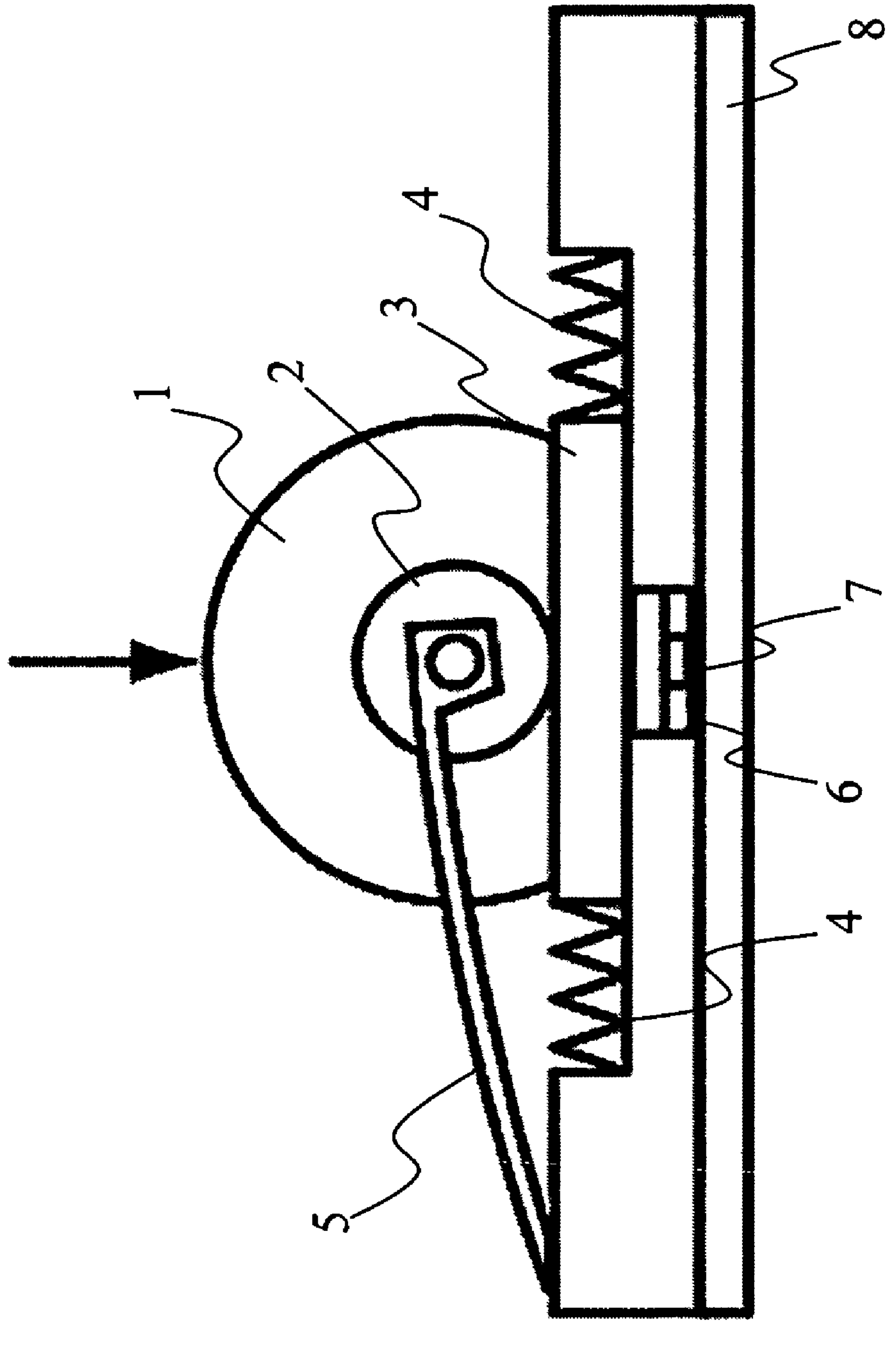
FIG. 2 depicts a schematic representation of an embodiment of the invention, where the pointing device is being depressed.
Figure 3:
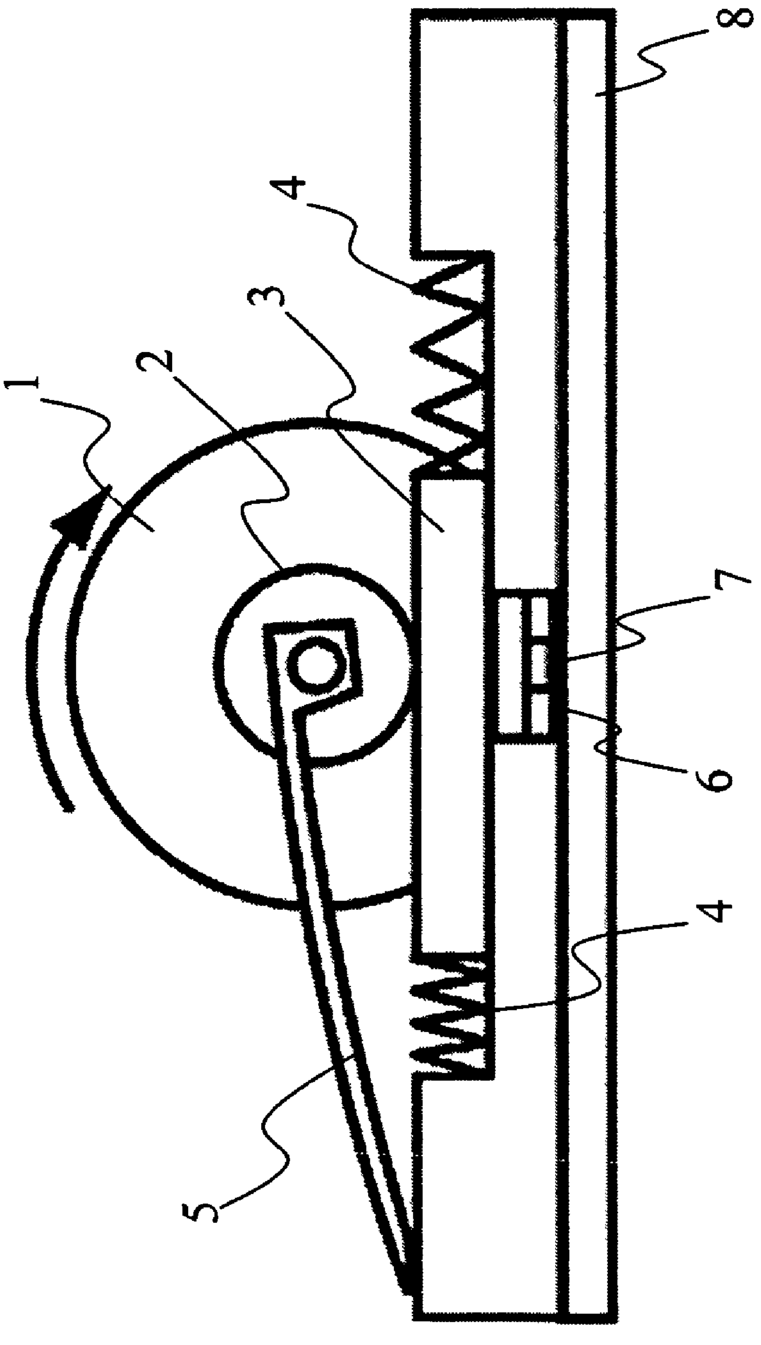
FIG. 3 depicts a schematic representation of an embodiment of the invention, where the pointing device is in another position.

FIGS. 1-3 show a schematic representation of various further embodiments of the invention.

In the example presented in FIG. 1, when the scroll wheel 1 is operated applying only moderate normal force with the finger, it rotates freely. The scroll wheel 1 thus can be used to scroll a list in a position control mode. A mechanism can be incorporated which provides tactile clicks or stops to indicate items in the list (not shown).

When more than a normal force is applied on the wheel 1 (FIG. 2), a spring 5 supporting the wheel 1 yields and the wheel 1 travels slightly downwards into a depressed position. Here, a gear 2 engages a rack 3. A dome switch 6,7 detects if the wheel 1 has been depressed and switches the input mode to a velocity control mode. The dome switch 6,7 also gives the user tactile feedback indicating that the spring-centered velocity control mode is now in use. Note, that both modes, i.e. the positions, can use the same sensor for detecting the wheels rotational position (not shown).

When the wheel 1 is now rotated (FIG. 3), a pair of centering springs 4 create an opposing force to the rotation and tend to bring the wheel 1 back to a center position. This will give the user tactile feedback aiding him in controlling the scrolling speed. It is also easy to stop scrolling by relieving the lateral force on the wheel 1, and letting the springs 4 center the wheel.

The user can return to the freely rotating position control mode by removing the normal force and letting the wheel 1 pop back up (this can be done even when the wheel 1 is still deflected in the velocity control mode). Selecting a highlighted item can be done by depressing the wheel and releasing it immediately. Alternatively there can be a specific switch for selection.

Rather than the normal spring 5, a buckling mechanism can be preferred for supporting the wheel 1. This way, the user does not need to apply so much force in order to hold the wheel 1 down in the depressed position. The buckling mechanism could also serve as the electrical switch for detecting depression.

Various further embodiments of the invention can be implemented also as a rotator and a rotating knob, which are essentially 1-DOF pointing devices. They can also be implemented as a trackball, which is a 2-DOF pointing device. In the spring-centered velocity control mode a trackball would function exactly like a joystick.

The actual ball of trackballs rests on rollers. The rotating ball drives the rollers by friction. According to various further embodiments, pushing the ball downwards would make these rollers engage a spring-centering mechanism. With a suitable choice of materials for the ball and the rollers there should be enough friction to prevent slippage even in the spring-centered mode.

The fact that the user is pressing the ball down in the spring-centered mode helps to create the necessary friction. Also, having the freely rotating mode in the up-position enables to ball to go on rotating (thanks to its inertia) after the user lets go of it. Alternatively the spring centering mode can be in the up-position and freely rotating mode in the down-position, of course.

Instead of using spring-centering mechanism, any of the input devices mentioned above could just be locked in place when depressed and used as a force-sensitive isometric input device. The drawback is that a separate force sensor is needed. The beauty of the spring-centered mode is that it uses the same sensor as the freely rotating mode. On the other hand, an isometric version would not need the centering springs.

Further, implementations include a slider, which is generally a 1-DOF input device with a linear movement. In the case of a slider and a rotating knob, it may be easier for the user (and technically too) to engage the spring mechanism by squeezing the input device rather than depressing it.

For all types of input device, active force feedback can be used instead of a spring centering for the velocity control method.

To conclude, various further embodiments of the invention bring the user great benefits in terms of ergonomics. They could be seen as an input method, which requires certain features from the input device.

Various further embodiments of the invention can be used in computer systems or applications. Furthermore they are applicable in mobile phones or portable electronic apparatuses in general.

Ramifications and Scope

Although the description above contains many specifics, these are merely provided to illustrate the invention and should not be construed as limitations of the invention's scope. It should be also noted that the various specifics can be combined in various ways in a single or multiple embodiments. Thus it will be apparent to those skilled in the art that various modifications and variations can be made in the apparatuses and processes of the present invention without departing form the spirit of scope of the invention.

The invention claimed is:

1. An apparatus comprising:

a pointing device configured: to control a pointer on a user interface linearly in accordance with an amount of movement of the pointing device when said pointing device is in a first position, and when said pointing device is in a second position, to control the pointer so that the pointer is configured to move with a speed, which speed is relative to a movement, which movement the pointing device is deflected from a central position of the pointing device wherein a pair of centering springs are configured to create, in said second position, an opposing force to the movement the pointing device is deflected and tending to bring the pointing device back to the central position in order to provide tactile feedback to aid in user control of the speed of the pointer, wherein whether the pointing device is in the first or second position is determined by whether the pointing device is in either a depressed position or a stand-by position.

2. The apparatus according to claim 1, wherein the pointing device comprises a rotating pointing device, wherein said first position is configured to control the pointer linearly in accordance with an amount of rotation movement of the pointing device, and said second position is configured to control the pointer so that the pointer is arranged to move with said speed, which speed is relative to said movement, which movement the rotating pointing device is deflected from said central position of the rotating pointing device.

3. The apparatus according to claim 2, wherein said second position is configured to control the pointer so that the pointer is configured to move with said speed, which speed is relative to an angular movement, in which angular movement the rotating pointing device is deflected from the central position of the rotating pointing device.

4. The apparatus according to claim 1, wherein said first position comprises the stand-by position and said second position comprises the depressed position, wherein a force is applied to the pointing device so that the pointing device is depressed.

5. The apparatus according to claim 4, wherein in said first position the pointing device is configured to rotate freely and in said second position the pointing device is configured to rotate so that upon rotation an opposing force to the direction of the rotation is established pursuant to bringing the pointing device to the central position.

6. The apparatus according to claim 1, further comprising a spring configured to switch the pointing device between said first and second positions.

7. The apparatus according to claim 6, wherein the spring is configured to output tactile feedback.

8. The apparatus according to claim 4, further comprising a dome switch configured to detect if the pointing device has been depressed into said second position.

9. The apparatus according to claim 8, wherein the dome switch is configured to provide user with tactile feedback.

10. The apparatus according to claim 1, further comprising a gear mounted onto the pointing device and configured to engage a rack so as to establish the pointing device in said second position.

11. The apparatus according to claim 1, further comprising a buckling mechanism configured to support the pointing device so that the buckling mechanism allows the pointing device to switch between the first and second positions.

12. The apparatus according to claim 1, wherein said second position comprises the stand-by position and said first position comprises the depressed position, wherein a force is applied to the pointing device so that the pointing device is depressed.

13. The apparatus according to claim 2, wherein said first position is configured to allow the rotating pointing device rotate more than 360 degrees of rotation.

14. The apparatus according to claim 1, wherein said pointing device comprises a slider, a scroll wheel, a roller, a rotator, a rotating knob or a trackball.

15. A system comprising a user interface and the apparatus according to claim 1, wherein the pointing device is configured to control the system.

16. A method comprising:

controlling a pointer on a user interface linearly in accordance with an amount of movement of a pointing device in a first position, switching the pointer device to a second position, and controlling the pointer so that the pointer is configured to move with a speed, which speed is relative to a movement, which movement the pointing device is deflected from a central position of the pointing device wherein a pair of centering springs are configured to create, in said second position, an opposing force to the movement the pointing device is deflected and tending to bring the pointing device back to the central position in order to provide tactile feedback to aid in user control of the speed of the pointer, wherein whether the pointing device is in the first or second position is determined by whether the pointing device is in either a depressed position or a stand-by position.

* * * * *